(12) United States Patent
Kepuska et al.

(10) Patent No.: US 7,085,717 B2
(45) Date of Patent: Aug. 1, 2006

(54) SCORING AND RE-SCORING DYNAMIC TIME WARPING OF SPEECH

(75) Inventors: Veton Z. Kepuska, Melbourne, FL (US); Harinath K. Reddy, Norwood, MA (US)

(73) Assignee: Thinkengine Networks, Inc., Marlborough, MA (US)

( * ) Notice: Subject to any disclaimer, the term of this patent is extended or adjusted under 35 U.S.C. 154(b) by 0 days.

(21) Appl. No.: 10/152,095

(22) Filed: May 21, 2002

(65) Prior Publication Data

US 2003/0220789 A1 Nov. 27, 2003

(51) Int. Cl.
*G10L 15/12* (2006.01)

(52) U.S. Cl. ........................ 704/241; 704/243

(58) Field of Classification Search ................ 704/241, 704/242, 243, 236, 238, 239
See application file for complete search history.

(56) References Cited

U.S. PATENT DOCUMENTS

| | | | | |
|---|---|---|---|---|
| 4,530,110 A * | 7/1985 | Nojiri et al. | .................. | 704/239 |
| 4,591,928 A | 5/1986 | Bloom et al. | .................. | 360/13 |
| 4,803,729 A | 2/1989 | Baker | .......................... | 704/241 |
| 4,876,720 A | 10/1989 | Kaneko et al. | .............. | 704/240 |
| 5,091,949 A | 2/1992 | King | .......................... | 704/253 |
| 5,159,637 A | 10/1992 | Okazaki et al. | ............. | 704/238 |
| 5,621,859 A | 4/1997 | Schwartz et al. | ........... | 704/256 |
| 5,710,864 A | 1/1998 | Juang et al. | | |
| 6,076,054 A | 6/2000 | Vysotsky et al. | ........... | 704/240 |
| 6,223,155 B1 | 4/2001 | Bayya | .......................... | 704/243 |

FOREIGN PATENT DOCUMENTS

WO PCT/US03/16051 5/2003

OTHER PUBLICATIONS

Sakoe et al., "Dynamic Programming Algorithm Optimization for Spoken Word Recognition", IEEE Transactions on Acoustics, Speech, and Signal Processing, vol. ASSP-26, No. 1, Feb. 1978, pp. 43-49.

(Continued)

*Primary Examiner*—Donald L. Storm
(74) *Attorney, Agent, or Firm*—Fish & Richardson P.C.

(57) ABSTRACT

A method includes (i) measuring first distances between (a) vectors belonging to a set of vectors that represent an utterance and (b) vectors belonging to a set of vectors that represent a template, the measuring being done in accordance with a first order of the utterance vectors a first order of the template vectors, and (ii) measuring second distances between (a) individual vectors belonging to the set of vectors that represent the utterance and (b) individual vectors belonging to the set of vectors that represent the template, the measuring being done in accordance with a second order of the utterance vectors and a second order of the template vectors, and (iii) in which the first template vector order and the second template vector order are different and/or the first utterance vector order and the second utterance vector order are different. In another aspect, a method includes measuring distances between vectors that represent an utterance and vectors that represent a template, generating information indicative of how well the vectors of the utterance match the vectors of the template, and making a matching decision based on the measured distances and on the generated information.

19 Claims, 6 Drawing Sheets

OTHER PUBLICATIONS

Figure 1:
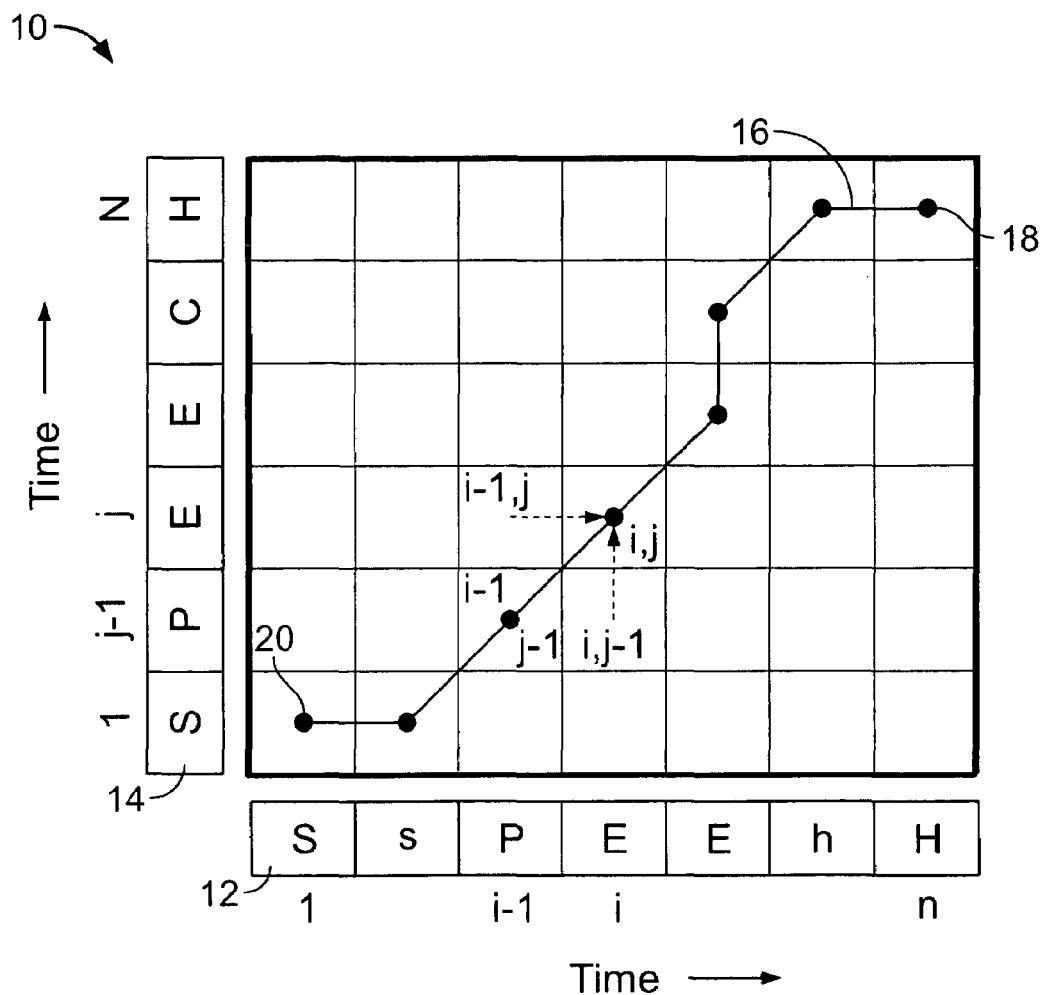

M. Creaney-Stockton, "Isolated Word Recogntiion Using Reduced Connectivity Neural Networks with Non-Linear Time Alignment Methods", Chapter 3: "Preprocessing of the Speech Data", pp. 1-7, University of Newcastle-Upon-Tyne, Aug. 1996.

L.R. Rabiner et al., "Digital Processing of Speech Signals", Chapter 4: Time-Domain Methods for Speech Processing; pp. 117-171, Prentice-Hall, 1978.

L. R. Rabiner et al, Chapter 3: Signal Processing and Analysis Methods for Speech Recognition, pp. 69-139, Prentice-Hall, 1978.

R. Duda et al., Pattern Classification, Second Edition, Chapter 2: Bayesian Decision Theory: pp. 20-83, John Wiley & Sons, 2001.

R. Duda et al., Pattern Classification, Second Edition, Chapter 5: Linear Discriminant Functions, pp. 215-221 and pp. 238-349, John Wiley & Sons, 2001.

R. Duda et al., Pattern Classification, Second Edition, Chapter 10: Unsupervised Learning and Clustering, pp. 517-599, John Wiley & Sons 2001.

R. Duda et al., "Pattern Classification," Second Edition, Chapter 5: "Linear Discriminant Functions," pp. 215-281, John Wiley & Sons, 2001.

R. Duda et al., "Pattern Classification," Second Edition, Chapter 6: "Multilayer Neural Networks," pp. 282-349, John Wiley & Sons, 2001.

EP Search Report.

* cited by examiner

SCORING AND RE-SCORING DYNAMIC TIME WARPING OF SPEECH

BACKGROUND

This description relates to dynamic time warping of speech.

Speech is a time-dependent process of high variability. One variability is the duration of a spoken word. Multiple utterances of a particular word by a single speaker may have different durations. Even when utterances of the word happen to have the same duration, a particular part of the word will often have different durations among the utterances. Durations also vary between speakers for utterances of a given word or part of a word.

Speech processing, for example, speech recognition, often involves comparing two instances of a word, such as comparing an uttered word to a model of a word. The durational variations of uttered words and parts of words can be accommodated by a non-linear time warping designed to align speech features of two speech instances that correspond to the same acoustic events before comparing the two speech instances. Dynamic time warping (DTW) is a dynamic programming technique suitable to match patterns that are time dependent. (See, for example, chapter 3 of "Isolated Word Recognition Using Reduced Connectivity Neural Networks With Non-Linear Time Alignment Methods", PhD dissertation of Mary Jo Creaney-Stockton, Stockton, BEng., MSc. Department of Electrical and Electronic Engineering, University of Newcastle-Upon-Tyne, August 1996, ##http://www.moonstar.com/*morticia/thesis/chapter*3.html##.

The result of applying DTW is a measure of similarity of a test pattern (for example, an uttered word) and a reference pattern (e.g., a template or model of a word). Each test pattern and each reference pattern may be represented as a sequence of vectors. The two speech patterns are aligned in time and DTW measures a global distance between the two sequences of vectors.

As shown in FIG. 1, a time-time matrix 10 illustrates the alignment process. The uttered word is represented by a sequence of feature vectors 12 (also called frames) arrayed along the horizontal axis. The template or model of the word is represented by a sequence of feature vectors 14 (also called frames) arrayed along the vertical axis. The feature vectors are generated at intervals of, for example, 0.01 sec (e.g., 100 feature vectors per second). Each feature vector captures properties of speech typically centered within 20–30 msec. Properties of the speech signal generally do not change significantly within a time duration of the analysis window (i.e., 20–30 msec). The analysis window is shifted by 0.01 sec to capture the properties of the speech signal in each successive time instance. Details of how a raw signal may be represented as a set of features are provided in: L. R. Rabiner and R. W. Schafer, "Digital Processing of Speech Signals", Prentice-Hall, 1978, Chapter 4: Time-Domain Methods for Speech Processing, pp 117–171, and "Fundamentals of Speech Recognition" Lawrence Rabiner, and Biing-Hwang Juang, Prentice Hall, 1993, Chapter 3., Signal Processing and Analysis Methods for Speech Recognition, pp. 69–139.

In the example of FIG. 1, the utterance is SsPEEhH, a noisy version of the template SPEECH. The utterance SsPEEhH will typically be compared to all other templates (i.e., reference patterns or models that correspond to other words) in a repository to find the template that is the best match. The best matching template is deemed to be the one that has the lowest global distance from the utterance, computed along a path 16 that best aligns the utterance with a given template, i.e., produces the lowest global distance of any alignment path between the utterance and the given template. By a path, we mean a series of associations between frames of the utterance and corresponding frames of the template. The complete universe of possible paths includes every possible set of associations between the frames. A global distance of a path is the sum of local distances for each of the associations of the path.

One way to find the path that yields the best match (i.e., lowest global distance) between the utterance and a given template is by evaluating all possible paths in the universe. That approach is time consuming because the number of possible paths is exponential with the length of the utterance. The matching process can be shortened by requiring that (a) a path cannot go backwards in time; (i.e., to the left or down in FIG. 1) (b) a path must include an association for every frame in the utterance, and (c) local distance scores are combined by adding to give a global distance.

For the moment, assume that a path must include an association for every frame in the template and every frame in the utterance. Then, for a point $(i, j)$ in the time-time matrix (where i indexes the utterance frame, j the template frame), the previous point must have been $(i-1, j-1)$, $(i-1, j)$ or $(i, j-1)$ (because of the prohibition of going backward in time).

The principle of dynamic programming (DP) is that a point $(i, j)$, the next selected point on the path, comes from one among $(i-1, j-1)$, $(i-1, j)$ or $(i, j-1)$ that has the lowest distance. DTW refers to this application of dynamic programming to speech recognition. DP finds the lowest distance path through the matrix, while minimizing the amount of computation. The DP algorithm operates in a time-synchronous manner by considering each column of the time-time matrix in succession (which is equivalent to processing the utterance frame-by-frame). For a template of length N (corresponding to an N-row matrix), the maximum number of paths being considered at any time is N. A test utterance feature vector j is compared to all reference template features, 1 . . . N, thus generating a vector of corresponding local distances $d(1, j), d(2, j), \ldots d(N, j)$.

If $D(i, j)$ is the global distance up to, but not including point $(i, j)$ and the local distance of $(i, j)$ is given by $d(i, j)$, then $$D(i, j) = \min[D(i-1, j-1), D(i-1, j), D(i, j-1)] + d(i, j) \quad (1)$$

Given that $D(1, 1) = d(1, 1)$ (this is the initial condition), we have the basis for an efficient recursive algorithm for computing $D(i, j)$. The final global distance $D(M, N)$ at the end of the path gives the overall lowest matching score of the template with the utterance, where M is the number of vectors of the utterance. The utterance is then recognized as the word corresponding to the template with the lowest matching score. (Note that N may be different for different templates.)

For basic speech recognition, DP has a small memory requirement. The only storage required by the search (as distinct from storage required for the templates) is an array that holds a single column of the time-time matrix.

Equation 1 enforces the rule that the only directions in which a path can move when at $(i, j)$ in the time-time matrix is up, right, or diagonally up and right. Computationally, equation 1 is in a form that could be recursively programmed. However, unless the language is optimized for recursion, this method can be slow even for relatively small pattern sizes. Another method that is both quicker and requires less memory storage uses two nested "for" loops. This method only needs two arrays that hold adjacent columns of the time-time matrix.

Figure 2:
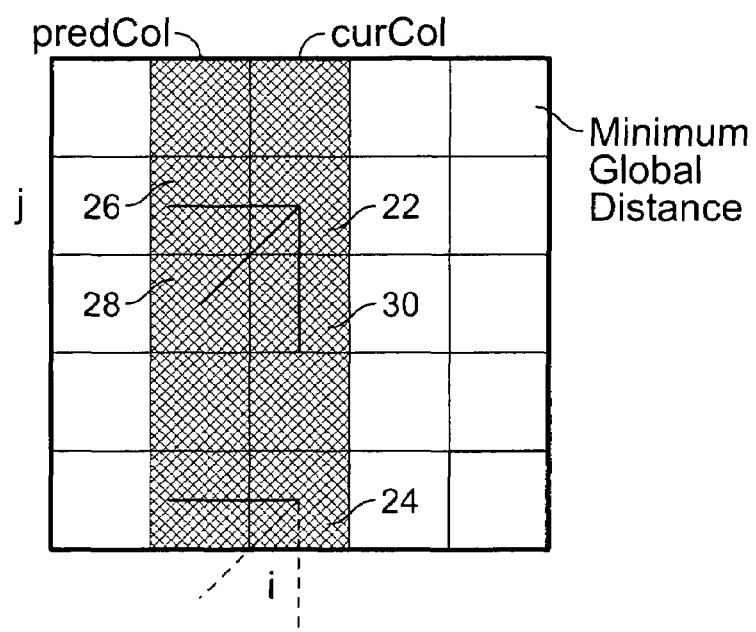

Referring to FIG. 2, the algorithm to find the least global distance path is as follows (Note that, in FIG. 2, which shows a representative set of rows and columns, the cells at (i, j) 22 and (i, 0) have different possible originator cells. The path to (i, 0) 24 can originate only from (i−1, 0). But the path to any other (i, j) can originate from the three standard locations 26, 28, 29):

1. Calculate the global distance for the bottom most cell of the left-most column, column 0. The global distance up to this cell is just its local distance. The calculation then proceeds upward in column 0. The global distance at each successive cell is the local distance for that cell plus the global distance to the cell below it. Column 0 is then designated the predCol (predecessor column).
2. Calculate the global distance to the bottom most cell of the next column, column 1 (which is designated the curCol, for current column). The global distance to that bottom most cell is the local distance for that cell plus the global distance to the bottom most cell of the predecessor column.
3. Calculate the global distance of the rest of the cells of curCol. For example, at cell (i, j) this is the local distance at (i, j) plus the minimum global distance at either (i−1, j), (i−1, j−1) or (i, j−1).
4. curCol becomes predCol and step 2 is repeated until all columns have been calculated.
5. Minimum global distance is the value stored in the top most cell of the last column.

The pseudocode for this process is:

```
calculate first column (predCol)
for i=1 to number of input feature vectors
    curCol[0] = local cost at (i,0) + global cost at (i−1,0)
    for j=1 to number of template feature vectors
        curCol[j]=local cost at (i,j) + minimum of global costs at (i−1,j), (i−1,j−1) or (i,j−1)
    end
    predCol=curCol
end
minimum global cost is value in curCol[number of template feature vectors]
```

To perform recognition on an utterance, the algorithm is repeated for each template. The template file that gives the lowest global matching score is picked as the most likely word.

Note that the minimum global matching score for a template need be compared only with a relatively limited number of alternative score values representing other minimum global matching scores (that is, even though there may be 1000 templates, many templates will share the same value for minimum global score). All that is needed for a correct recognition is the best matching score to be produced by a corresponding template. The best matching score is simply the one that is relatively the lowest compared to other scores. Thus, we may call this a "relative scoring" approach to word matching. The situation in which two matches share a common score can be resolved in various ways, for example, by a tie breaking rule, by asking the user to confirm, or by picking the one that has lowest maximal local distance. However, the case of ties is irrelevant for recognizing a single "OnWord" and practically never occurs.

This algorithm works well for tasks having a relatively small number of possible choices, for example, recognizing one word from among 10–100 possible ones. The average number of alternatives for a given recognition cycle of an utterance is called the perplexity of the recognition.

However, the algorithm is not practical for real-time tasks that have nearly infinite perplexity, for example, correctly detecting and recognizing a specific word/command phrase (for example, a so-called wake-up word, hot word or OnWord) from all other possible words/phrases/sounds. It is impractical to have a corresponding model for every possible word/phrase/sound that is not the word to be recognized. And absolute values of matching scores are not suited to select correct word recognition because of wide variability in the scores.

More generally, templates against which an utterance are to be matched may be divided between those that are within a vocabulary of interest (called in-vocabulary or INV) and those that are outside a vocabulary of interest (called out-of-vocabulary or OOV). Then a threshold can be set so that an utterance that yields a test score below the threshold is deemed to be INV, and an utterance that has a score greater than the threshold is considered not to be a correct word (OOV). Typically, this approach can correctly recognize less than 50% of INV words (correct acceptance) and treats 50% of uttered words as OOV (false rejection). On the other hand, using the same threshold, about 5%–10% of utterances of OOV words would be recognized as INV (false acceptance).

SUMMARY

In general, in one aspect, the invention features a method that includes (i) measuring first distances between (a) vectors belonging to a set of vectors that represent an utterance and (b) vectors belonging to a set of vectors that represent a template, the measuring being done in accordance with a first order of the utterance vectors a first order of the template vectors, and (ii) measuring second distances between (a) individual vectors belonging to the set of vectors that represent the utterance and (b) individual vectors belonging to the set of vectors that represent the template, the measuring being done in accordance with a second order of the utterance vectors and a second order of the template vectors, and (iii) in which the first template vector order and the second template vector order are different and/or the first utterance vector order and the second utterance vector order are different.

Implementations of the invention may include one or more of the following features. The first distances and the second distances are used in connection with a speech processing operation. The first template order is the reverse of the second template order or the first utterance vector order is the reverse of the second utterance vector order. The matching includes relative scoring of the utterance with respect to the template and with respect to other templates.

The first utterance order and the first template order are based on original orders of the utterance vectors and the template vectors. The measuring of first distances and the measuring of second distances are performed with respect to multiple templates. The measure of first distances may be outside of a pre-specified threshold, and the measure of second distances indicates that the template represents an out-of-vocabulary utterance. The measured second distances is used to reject the template as a match for the utterance even though the first distances imply a match. The measuring of the first distances is done in parallel with the measuring of the second distances. Third distances are measured between (a) individual vectors belonging to the set of vectors that represent the utterance and (b) individual vectors belonging to the set of vectors that represent the template, the measuring being done in accordance with a third order of the utterance vectors and a third order of the template vectors. The second distances are measured with the template vectors in an original order and the utterance vectors in a reversed order, and the third distances are measured with the utterance vectors in an original order and the template vectors in a reversed order.

In some implementations, the method also includes generating information indicative of how well the vectors of the utterance match the vectors of the template and making a matching decision based on the measured distances and on the generated information. The generating of information includes producing a distribution of values associated with the vectors of the template, the values indicating the frequency with which reference template vectors produce a minimum local distance in matching with vectors of the utterance. The matching decision is based on the extent to which the distribution is non-uniform. The matching decision is based on the spikiness of the distribution. The matching decision is based on how well the entire set of vectors representing the template are used in the matching. The measuring of distances includes generating a raw dynamic time warping score and rescoring the score based on the information indicative of how well the vectors of the utterance match the vectors of the template. The rescoring is based on both the spikiness of the distribution and the on how well the entire set of vectors representing the template are used in the matching.

Other advantages and features will become apparent from the following description and from the claims.

DESCRIPTION

Figure 3:
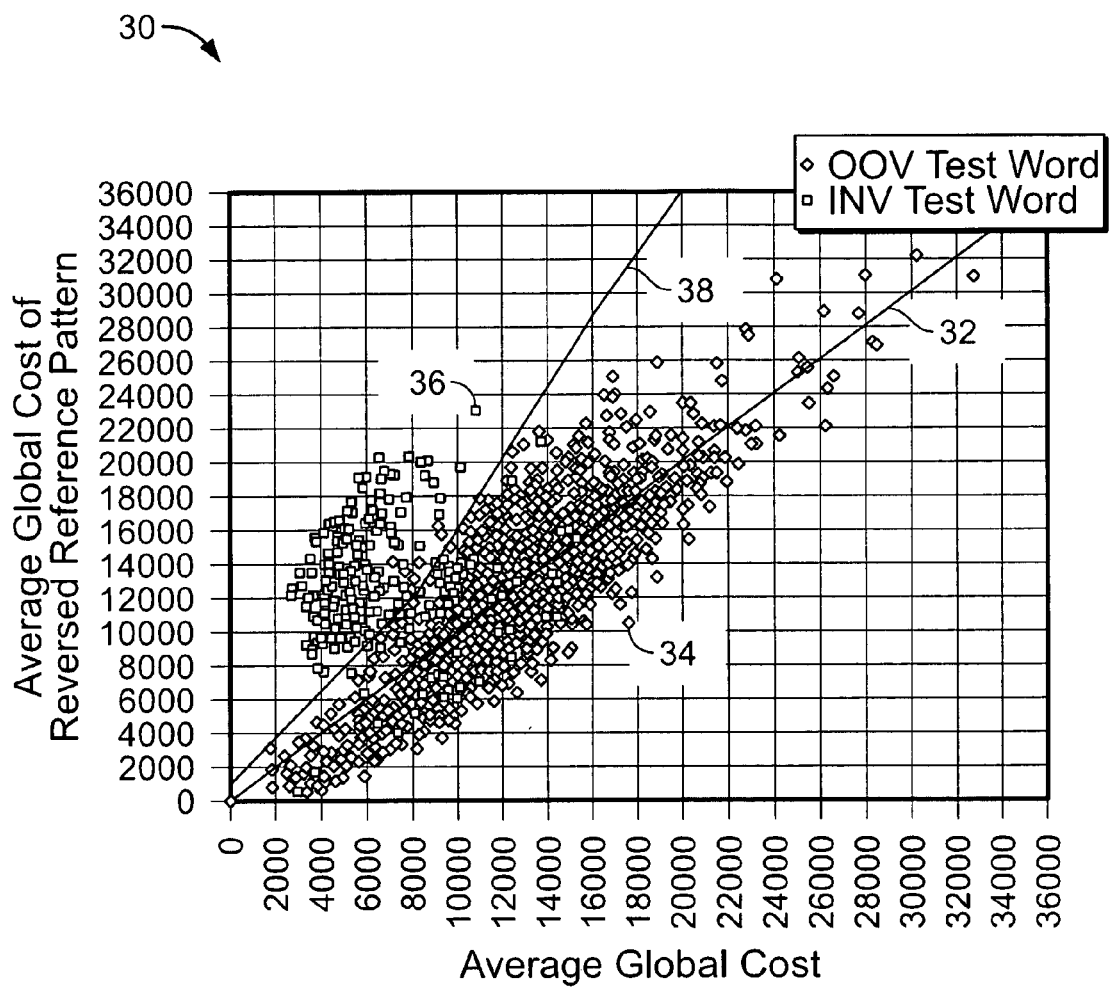
Figure 4:
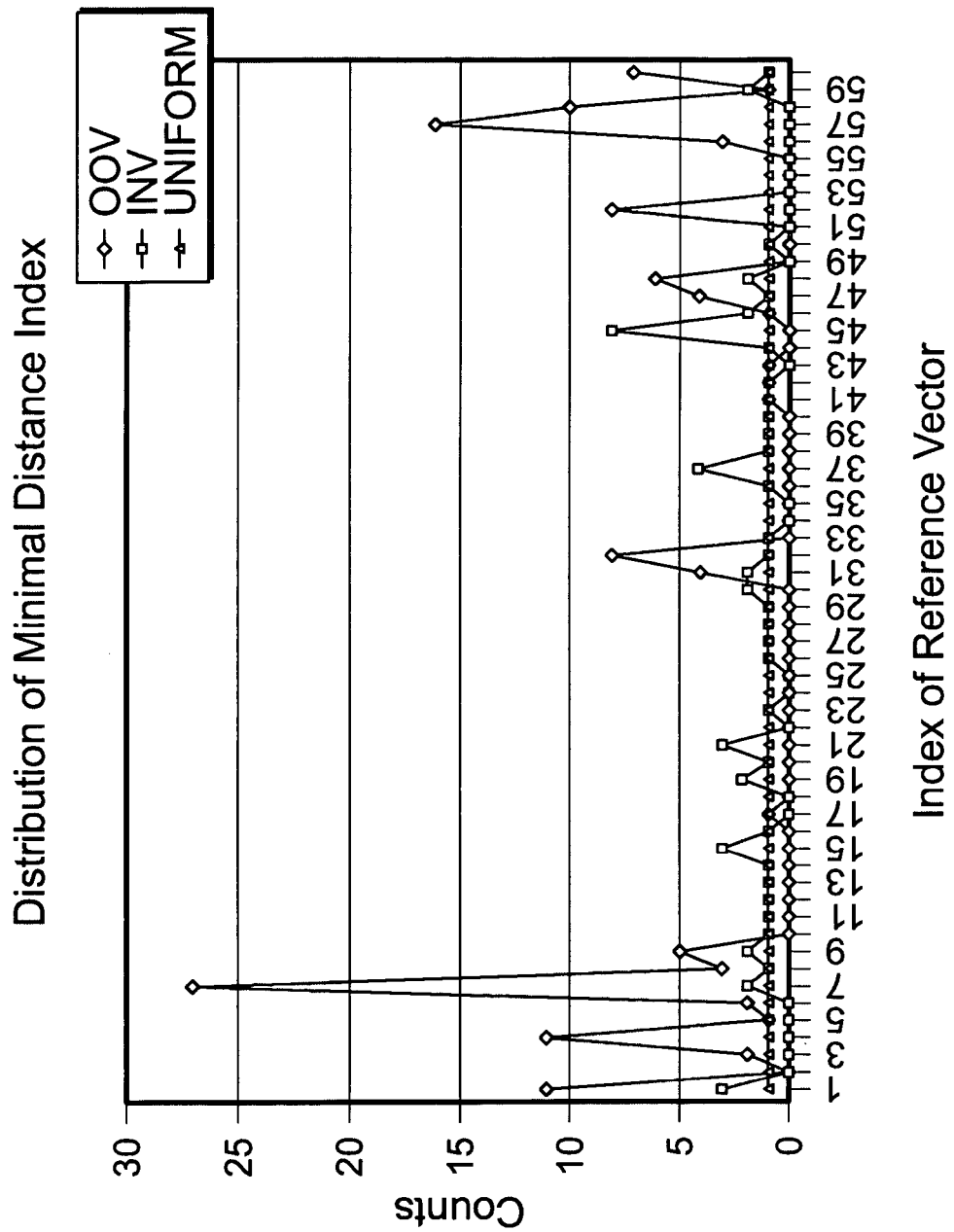
Figure 5:
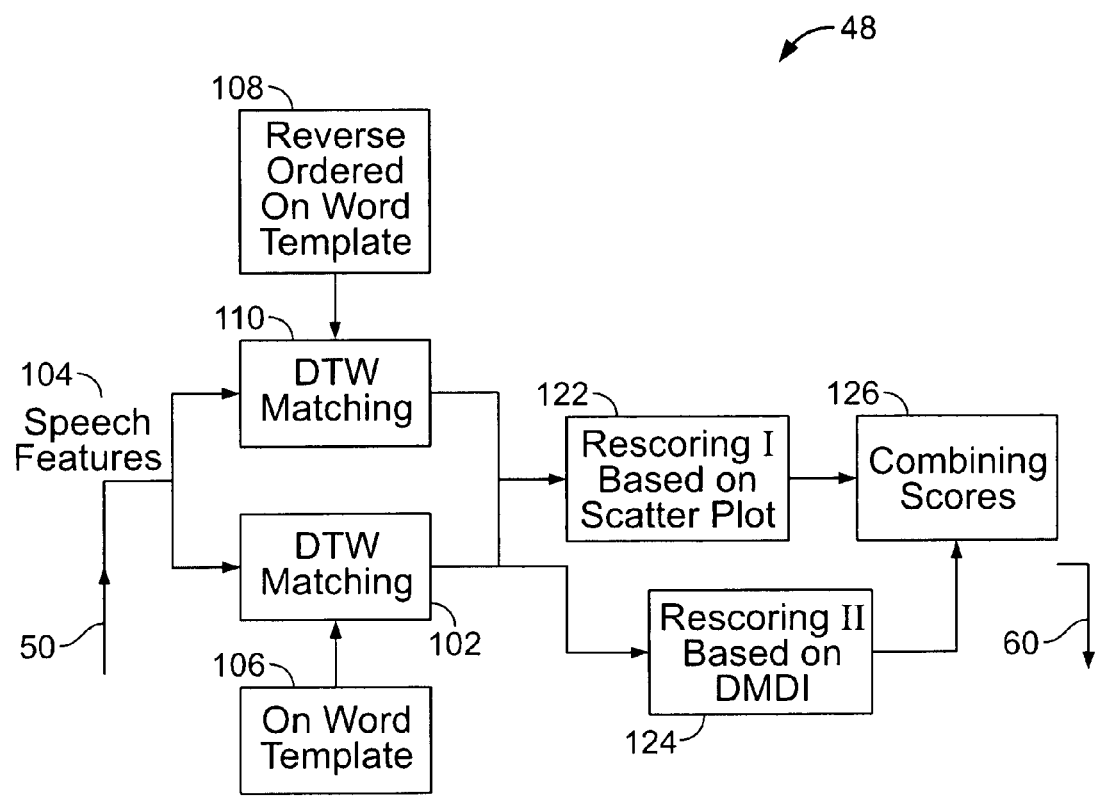
Figure 6:
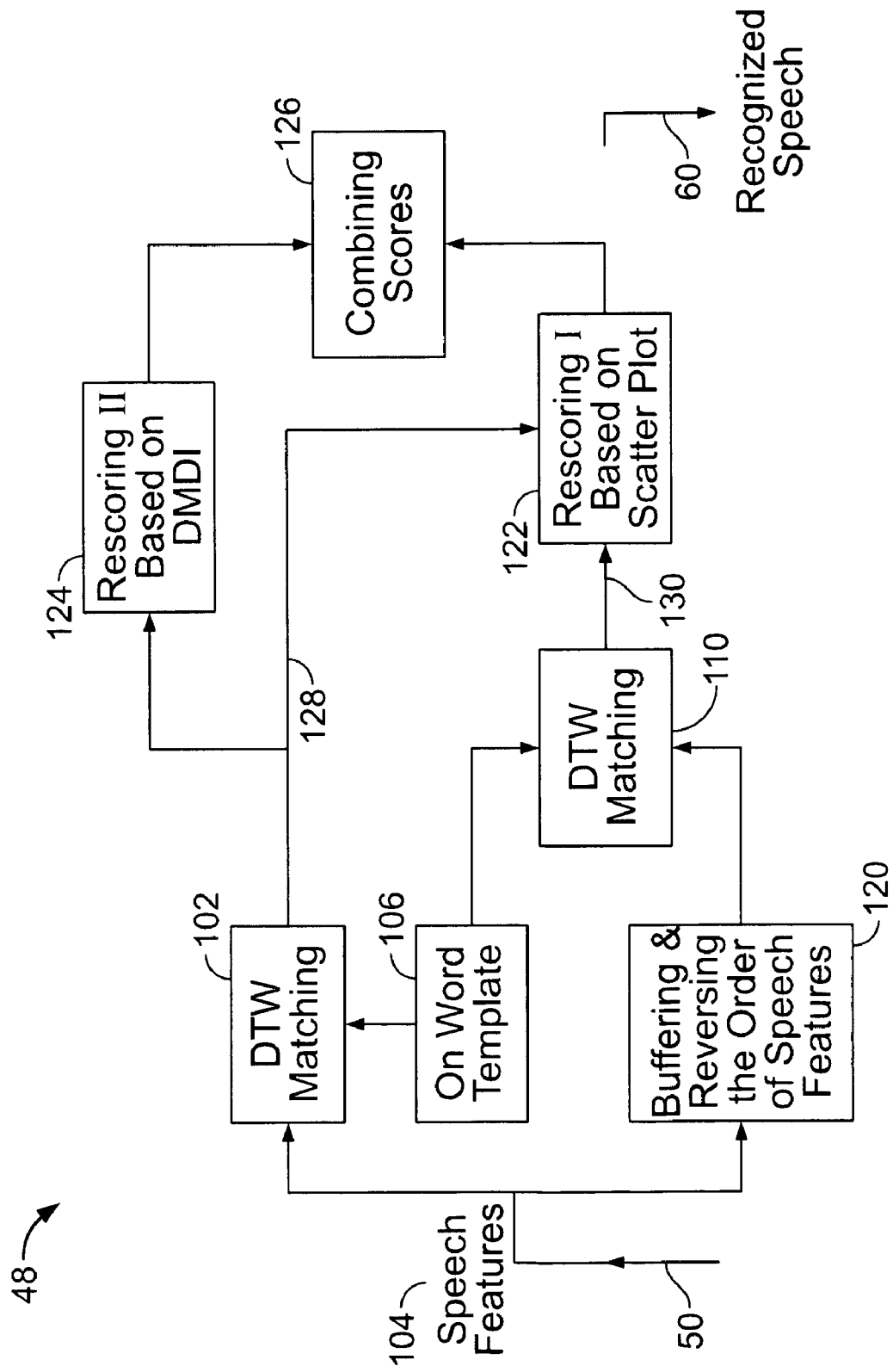

FIG. 1 is a path diagram.
FIG. 2 is a fragment of a path diagram.
FIG. 3 is a scatter plot.
FIG. 4 is a distribution graph.
FIGS. 5 and 6 show block diagrams.

To use the relative scoring approach for word recognition, for example, for "on word" recognition, it is useful to increase the correct acceptance rate to at least 90% and to reduce the false acceptance rate to an insignificant number, e.g., less than 0.01%.

Reverse Matching

As shown in FIG. 5, one way to improve the relative scoring method is to repeat each matching 102 of the speech features 104 of an utterance (which we also call a test pattern) with a given template 106 (e.g., an on word template) by using the same frames of the template but reversing their order 108. When the template frames are reversed, a test pattern that is INV (as defined earlier) and that has a relatively good matching score in the initial matching is expected to have a significantly worse matching score in the second matching 110 with the reversed-order template. One reason for this difference in scores is the constraint of DTW that prohibits a matching path from progressing backward in time.

For example, if a template represents the word VOYAGER and the test pattern also represents the word voyager, the matching of normally ordered frames will occur from left to right "V" would best match "v" (i.e., local distance of zero), "O" will best match "o", and so own. However, when matching REGAYOV (reversed order for VOYAGER) with voyager, the matching path cannot go backward in time and there will be a poor match because "R" will not match well with "v", "o" will not match well with "E" and so on.

On the other hand, an OOV (i.e., out-of-vocabulary) test pattern would be expected to have comparable matching scores for both the normal and reverse orders of frames because matching of features may be more or less random regardless of the order. For example if the template is for the word DISCOVER and the test pattern is for the word tra*v*el, the features corresponding to the underlined sounds would match well but not the ones marked in italics. The other features of the words would match poorly. With reversed matching other segments are good matches: REVOCSID and tra*v*el. The global matching score will be more or less about the same as in normal order.

As shown in FIG. 6, a similar effect can be achieved by reversing the order of frames in the test pattern 120 instead of the template (which we also call the reference pattern). Which approach is used may depend on the hardware platform and software architectural solution of the application. One goal is the minimization of the latency of the response of the system. If CPU and memory resources are not an issue, both approaches can be used and all three resulting scores may be used to achieve a more accurate recognition and rejection.

FIG. 3 shows a scatter plot 30 of average global distance (i.e., global distance divided by number of test vectors) of the reversed reference pattern and average global distance of the pattern in its original order. Each point plots the distance of the same uttered word (token) against an original-order template and a reversed-order template For example, a point on the 45-degree line 32 would have the same distance for matching done in the normal order of frames and for matching done in the reverse order of frames. Diamond points 34 are OOV and square points 36 are INV. The OOV points are clustered largely along the diagonal line 32, which indicates that average global distance for the original order matching and for the reverse order matching are generally uncorrelated with the direction of the frames. The scatter of INV points is largely above the diagonal indicating that the average global distances are correlated with the direction of the frames. The INV test words that correspond to square points below the diagonal line largely depict cases associated with a failure of the voice activity detector to correctly determine the beginning and ending of the test word, thus producing partial segmentation of a word or missing it completely. The remaining INV test words correspond to square points that can be recovered by normalization rescoring described later.

The line 38 in FIG. 3 depicts a discriminating surface that would maximally separate OOV points from INV points (e.g., a minimal classification error rate in Bayesian terms).

The reverse order matching step can be used in a variety of ways:

1. As a second pass rejection if the global matching distance is above a pre-specified threshold (likelihood of false rejection increases) and confusion with OOV (false acceptance) is possible. This use will require a full buffer of templates in reverse order. This use is appropriate when the CPU is not pegged and there is no drawback if the operation is performed on demand.

2. By reversing the reference pattern rather than the uttered word pattern. This is statistically equivalent to reversing the uttered word pattern, but can be done in real-time in parallel with normal matching, thus avoiding adding latency to the recognition system. This use may be preferred when there is sufficient CPU power to run two passes in parallel and overloading the CPU for a short period of time is not desirable.

3. Combining both techniques if enough CPU and memory capacity are available. Although they are statistically equivalent, they do not give the same results. Thus, combining them will provide additional performance gain.

Rescoring

Another approach that can be used independently or in conjunction with the order-reversal technique and that does not require a second pass matching is described next. This second approach supplements the matching of original features (frames, vectors) by a measure of how well the feature vectors of the test pattern (the uttered word) are matched by the feature vectors of the reference pattern. An INV word ideally would match each reference pattern's vectors only once. An OOV word would typically match only sections of each reference pattern (e.g., in the words DISCOVER and tra<u>vel</u>, the features corresponding to the sounds that are underscored would match well as would the features corresponding to the sounds that are italicized, but the sequence of the matches would be in reversed order).

One technique for measuring how well the test vectors match the reference vectors works as follows: In DTW, for each test vector (frame) associated with an utterance, there is only one reference vector that gives the lowest local distance. Suppose that, for each reference vector of a reference template, we maintain a counter of how many times that reference vector gave the lowest local distance in matching with the different test vectors of the utterance. At the end of matching for the given utterance, the array of counters stores the number of times the respective reference vectors had the lowest local distance. These numbers will indicate which regions (successive vectors) of a reference pattern are good matches for test vectors. Each counter in the array is identified by the same index that identifies the position of the corresponding reference vector within the reference pattern.

The counts in the counters together represent a distribution of the number of minimum distances as a function of index. For a reference template that is a good match with a test pattern, the distribution is more or less uniform and flat, because all vectors of the reference pattern form minimum distance matches with the vectors of the test pattern. This situation is typically true for an INV word. If test vectors are from INV words, good matching would occur for each test feature vector (e.g., each sound) distributed across all reference vectors. For an OOV word, by contrast, the distribution would be significantly less uniform and peaky-er, because only some sections of the feature vectors would match, as in the example above (FIG. 4), while other vectors would match only at random. Thus, the dissimilarity of the distribution of the number of minimum distance matches from a uniform distribution is a good discriminator of INV and OOV words.

Another way to describe this approach is to assume that we are matching the reference template with itself, so that the "test" sequence and the reference sequence of vectors are identical and each of length r (i.e., each contains r vectors).

For a test feature vector that corresponds to a time j, T(j), the local distance of vector T(j) from a reference vector R(i) is determined as a distance or dissimilarity D (typically a Euclidean distance, because this distance metric has useful properties, such as: $D[R, T] \geq 0$.):

local_distance $(i, j) = D[R(i), T(j)]$.

We have assumed that $T(k) = R(k)$, for all k=0 to r; therefore, the local_distance (k, k)=0 because $D[R(k),T(k)]$ =0. Furthermore, let counter (k) contain the number of times the reference vector R(k) produced minimal local_distance (k, j) for all j=0 to r in matches with each of the vectors of the test pattern.

In this ideal case, counter(k)=1 for all k=0 to k=r, because local_distance (k, k)=0 for all k=0 to k=r, and local_distance (i, j)>0 for i≠j. Thus, the distribution of minimal distance index (DMDI) is uniform and equal to 1.

In general for any sequence of test vectors {T} of the same word/command phrase as reference vectors {R}, the distribution is fairly uniform and deviates from uniformity to the extent that {T} and {R} are different. Duration variations naturally increase deviation of DMDI from uniform.

This method is useful in cases where an OOV test pattern {T} yields a small DTW global matching score (incorrectly suggesting a good match) and thus makes recognition invalid (false acceptance). Because the DMDI of this match significantly departs from uniform, it is possible to exploit the non-uniformity as a basis for disregarding the putative match to prevent an invalid recognition.

FIG. 4 depicts DMDIs for an INV word (shown by squares), an OOV word (diamonds) and a uniform distribution (triangles) for comparison. FIG. 4 shows that the DMDI of an OOV word is spikier than the DMDI of an INV word, and that the number of reference vectors that do not become minimal distance vectors is significantly larger for OOV (38 vectors in the example) than for INV (21 vectors). A measure of uniformity of distribution that will account for these effects provides a way to rescore an original DTW score to avoid invalid recognitions of OOV words. The uniformity measure would be used to reduce the DTW raw score for a DMDI that is closer to a uniform distribution and to increase the DTW raw score for a DMDI that departs from a uniform distribution.

One example of a uniformity measure would be based on two functions. One function is a measure of spikiness, σ, of a distribution:

$$\sigma = \frac{1}{R} \sum_{i=0}^{R-1} \left( \sum \min\{R(i)\} - N \right)^P, \quad \text{for } \sum \min\{R(i)\} > N$$

R represents the number of reference vectors in the reference pattern. N represents an empirically determined parameter (e.g., N=5). p is an empirically established constant (e.g., p=2), and $$\sum \min\{R(i)\}$$

represents a count of how many times reference vector R(i) had a minimal distance from a test vector T(j).

A second function is based on a value, φ, that represents a measure of how well the entire set of vectors of a reference pattern are used in matching. φ is the total number of reference vectors that did not have minimal distance from any test vector. The second function that is used as part of the uniformity measure is an exponential function that empirically performed well:

$$\zeta = \frac{\gamma}{R} e^{\alpha \frac{\phi}{R} + \beta}$$

Other functions could also be used.

The values of the two functions σ and ζ are combined to give one DMDI penalty; e.g, σ*ζ that is used to rescore an original DTW raw score of a DMDI.

Note that the function γ can be used to control the contribution of ζ as compared to σ. The ratio αφ/R determines the rate of the proportion of reference vectors that were not selected as best representing vectors out of the total number of reference vectors. β is used to control minimal number φ must have before this measure can have any significant effect.

As shown in FIGS. 5 and 6, the results of matching can be subjected to a first rescoring 122 based on a scatter plot, for example, of the kind shown in FIG. 3 and a second rescoring 124 based on a DMDI, for example, of the kind shown in FIG. 4. The rescorings can then be combined 126.

Combining of scores may be done in the following way.

When the voice activity detector signals a change of state from speech to no-speech, the dynamic time warping module emits its final raw matching scores 128, 130 for original ordered reference template vectors of the template and reversed ordered reference template vectors (or alternatively reversed ordered test template vectors or both). Those scores, namely raw_score and reverse_raw_score are normalized by the number of test vectors T, generating respectively average_score and reverse_average_score $$\text{average\_score} = \frac{1}{T}\text{raw\_score}$$

$$\text{reverse\_average\_score} = \frac{1}{T}\text{reverse\_raw\_score}$$

In the case of a fixed point implementation, to preserve sufficient precision this calculation is implemented as follows:

aver_score=extract_h(L_shl(L_mult(raw_score, den),6));

aver_revscore=extract_h(L_shl(L_mult(raw_revscore, den),6));

where den is a fixed point representation of 1/T, L_mult is a fixed point multiplication operator, L_shl, is a shift left operator, and extract_h is a high order byte extraction operation.

Next, the rescoring is applied. From the histogram of matches described above under the heading Rescoring, two parameters are computed: the number of zero matches and the distribution distortion. Fixed-point implementation of the computation of rescoring parameters respectively denoted by n_zeros and n_bestmatchs may be done as follows:

```
ddist = 0;
zerocount = 0;
for(i=0; i<num_vecs; i++)
{
    if(histo[i] > 0)   {
        tmp = sub(histo[i], 1) ;
        ddist = L_mac(ddist, tmp, tmp) ;
    }
    else {
        zerocount++;
    }
}
n_zeros        = zerocount;
n_bestmatchs   = sature(ddist) ;
``` where sub denotes a fixed point subtraction operator, L_mac denotes a multiply-add fixed point operator, and sature denotes a saturation operator ensuring that the content of the variable saturates to the given fixed point precision without overflowing.

For each match (e.g., original ordered features and reverse ordered features) two parameters indicating the "goodness of matching" as described above are computed: n_zeros, n_bestmatchs for original ordered features, and reverse_n_zeros, reverse_n_bestmatchs for reverse ordered features match.

Parameter n_zeros, of reverse and normal order matches, is normalized to account for the differences in the numbers of vector in test and reference patterns. For test features that have fewer vectors, T, than reference, R, there are automatically going to be R-T additional number of zero matches in n_zeros. If that number of test feature vectors is greater then the number of reference feature vectors, there are likely to be T-R fewer zero matches in n_zeros. To account for this fact the n_zeros parameter is normalized by:

$$\text{norm\_n\_zeros} = \frac{\text{n\_zeros} + T - R}{T}$$

$$\text{norm\_reverse\_n\_zeros} = \frac{\text{reverse\_n\_zeros} + T - R}{T}$$

A correction term is computed as the difference of norm_n_zeros−norm_reverse_n_zeros.

delta_n_zeros=norm_n_zeros−norm_reverse_n_zeros

For INV words norm_n_zeros has lower values than norm_reverse_n_zeros thus this correction will reduce the score. For OOV words those two parameters have similar values thus not contributing to adjustment of the original score at all.

The two parameters delta_n_zeros and n_bestmatchs are then used to adjust the average score as follows:

```
adj_aver_score   = sature(L_add(aver_score,
                   L_add(n_bestmatchs,delta_n_zeros
                   ))) ;
```

From the scatter plot obtained from training data (FIG. 3) the optimal discriminating surface can be computed. There are numerous techniques that can be used to compute this surface (e.g., in this case a line because the space is two-dimensional, FIG. 3). For example, the surface can be computed using (a) parametric techniques by generating discriminant functions assuming that distributions (FIG. 3) are Gaussian (see Chapter 2 of R. Duda, P. Hart, D. Stork, "Pattern Classification", John Wiley & Sons, 2001 Second Edition), (b) nonparametric techniques where distributions are assumed to be unknown, (c) techniques based on linear discriminant functions (Chapter 5 of R. Duda . . . ) (d) techniques based on nonlinear disriminant functions (multi layer neural networks, Chapter 6 of R. Duda . . . ), and (e) unsupervised learning and clustering techniques, (Chapter 10 of R. Duda . . . ). If the CPU and memory resources are not of concern, then the method that would give the best (e.g., minimal) error rate may be chosen among the techniques mentioned. However, in the case of restrictions imposed by fixed-point hardware, the discriminating surface may be approximated by a straight line. The idea is to adjust the score based on how far a particular point with coordinates (aver_score, aver_revscore) is from the discriminating surface. If the point is on the side of INV then the score is reduced proportionally to this distance otherwise the score is increased.

delta_scatter =
L_shl(L_sub(L_add(L_shl(aver_score,1),mult(aver_score,21845)) ,
    aver_revscore), 2) ;

Finally the adj_aver_score and delta_scatter are combined by adding them and mapping them through a table to give a confidence score that has the range of values from [0–100]%:

```
/* combining scores */
score1 = L_add(adj_aver_score, delta_scatter) ;
/* using only high 8 bits of precision */
score2 = L_shr(score1, 8) ;
/* mapping into confidence score */
if(score2 > 0)
{
    if(score2 > 255)
        conf_score = 0;
    else
        conf_score = expScoreTbl[score2] ;
}
else
    conf_score = 100;
```

We have described specific implementations of two techniques for adjusting original (raw) DTW scores, one implementation that performs an additional reverse match, the other implementation of which rescores based on DMDI. We have shown implementations in which the two implementations are combined to achieve robust recognition. However, each of the two techniques may be implemented independently to adjust raw DTW scores.

As shown in FIGS. 5 and 6, the features described above may be implemented in hardware, software, or a combination of the two. In some implementations, a speech signal 50 is received from a telephone line, a network medium, wirelessly, or in any other possible way, at a speech processor 48. The speech processor may perform one or more of a wide variety of speech processing functions for one or more (including a very large number of) incoming speech signals 50. One of the functions may be speech recognition. The speech processor may be part of a larger system. The speech processor may include a dynamic time warping device that implements the matching elements 102, 110 and that uses the speech signal and speech templates 106, 108, 120 to generate a raw DTW score 128, 130. The rescoring devices modify the raw DTW score to generate rescored DTW values. The rescored DTW values may then be used in generating recognized speech 60. The recognized speech may be used for a variety of purposes.

Although particular implementations have been described, other implementations are also within the scope of the following claims. For example, other arrangements of vectors in addition to simple reversal of their order may be useful in the DTW system.

We claim:
1. A method comprising
    measuring first distances between (a) vectors belonging to a set of vectors that represent an utterance and (b) vectors belonging to a set of vectors that represent a template, the measuring being done in accordance with a first order of the utterance vectors and a first order of the template vectors, and
    measuring second distances between (a) vectors belonging to the set of vectors that represent the utterance and (b) vectors belonging to the set of vectors that represent the template, the measuring being done in accordance with a second order of the utterance vectors and a second order of the template vectors,
    in which the first template vector order and the second template vector order are different and/or the first utterance vector order and the second utterance vector order are different, and
    in which the measure of first distances is outside of a pre-specified threshold, and the measure of second distances indicates that the template represents an out-of-vocabulary utterance.

2. The method of claim 1 also including using the first distances and the second distances in connection with a speech processing operation.

3. The method of claim 1 in which the first template order is the reverse of the second template order or the first utterance vector order is the reverse of the second utterance vector order.

4. The method of claim 1 also including relative scoring of the utterance with respect to the template and with respect to other templates.

5. The method of claim 1 in which the first utterance order and the first template order are based on original orders of the utterance vectors and the template vectors.

6. The method of claim 1 in which the measuring of first distances and the measuring of second distances are performed with respect to multiple templates.

7. The method of claim 1 also including
    generating information indicative of how well the vectors of the utterance match the vectors of the template, and
    making a matching decision based on the measured distances and on the generated information.

8. A method comprising
    measuring first distances between (a) vectors belonging to a set of vectors that represent an utterance and (b) vectors belonging to a set of vectors that represent a template, the measuring being done in accordance with a first order of the utterance vectors and a first order of the template vectors, and
    measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, and in which the method also includes using the measured second distances to reject the template as a match for the utterance even though the first distances imply a match.

9. A method comprising measuring first distances between (a) vectors belonging to a set of vectors that represent an utterance and (b) vectors belonging to a set of vectors that represent a template, the measuring being done in accordance with a first order of the utterance vectors and a first order of the template vectors, and measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, and in which the measuring of the first distances is done in parallel with the measuring of the second distances.

10. A method comprising measuring first distances between (a) vectors belonging to a set of vectors that represent an utterance and (b) vectors belonging to a set of vectors that represent a template, the measuring being done in accordance with a first order of the utterance vectors and a first order of the template vectors, and measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, the method also including measuring third distances between (a) individual vectors belonging to the set of vectors that represent the utterance and (b) individual vectors belonging to the set of vectors that represent the template, the measuring being done in accordance with a third order of the utterance vectors and a third order of the template vectors.

11. The method of claim 10 in which the second distances are measured with the template vectors in an original order and the utterance vectors in a reversed order, and the third distances are measured with the utterance vectors in an original order and the template vectors in a reversed order.

12. A method comprising measuring first distances between (a) vectors belonging to a set of vectors that represent an utterance and (b) vectors belonging to a set of vectors that represent a template, the measuring being done in accordance with a first order of the utterance vectors and a first order of the template vectors, and measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, generating information indicative of how well the vectors of the utterance match the vectors of the template, including producing a distribution of values associated with the vectors of the template, the values indicating the frequency with which reference template vectors produce a minimum local distance in matching with vectors of the utterance, making a matching decision based on the measured distances and on the generated information.

13. The method of claim 12 in which the matching decision is based on the extent to which the distribution is non-uniform.

14. The method of claim 13 in which the matching decision is based on the spikiness of the distribution.

15. The method of claim 13 in which the matching decision is based on how well the entire set of vectors representing the template are used in the matching.

16. A method comprising measuring first distances between (a) vectors belonging to a set of vectors that represent an utterance and (b) vectors belonging to a set of vectors that represent a template, the measuring being done in accordance with a first order of the utterance vectors and a first order of the template vectors, and measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, generating information indicative of how well the vectors of the utterance match the vectors of the template, and making a matching decision based on the measured distances and on the generated information in which the measuring of distances includes generating a raw dynamic time warping score and rescoring the score based on the information indicative of how well the vectors of the utterance match the vectors of the template.

17. The method of claim 16 in which the rescoring is based on both the spikiness of a distribution and how well the entire set of vectors representing the template are used in the matching.

18. A method comprising measuring first distances between (a) vectors belonging to a set of vectors that represent an utterance and (b) vectors belonging to a set of vectors that represent a template, the measuring being done in accordance with a first order of the utterance vectors and a first order of the template vectors, and measuring second distances between (a) vectors belonging to the set of vectors that represent the utterance and (b) vectors belonging to the set of vectors that represent the template, the measuring being done in accordance with a second order of the utterance vectors and a second order of the template vectors, in which the first template vector order and the second template vector order are different and/or the first utterance vector order and the second utterance vector order are different, producing a distribution of values associated with the vectors of the template, the values indicating the frequency with which reference template vectors produce a minimum local distance in matching with vectors of the utterance, and rescoring a score based on a spikiness of the distribution and on how well the entire set of vectors representing the template are used in the matching.

19. A method comprising receiving an utterance, forming a time-ordered series of vectors representing the utterance, using dynamic time warping to score the utterance vectors against time-ordered series of vectors representing templates of possible utterances, the scoring being done using the template vectors and utterance vectors in their time order, using dynamic time warping to additionally score the utterance vectors against the vectors representing templates, the additional scoring being done using a different time-order of vectors of one or both of the template vectors and utterance vectors, and selecting one of the templates as a match for the utterance based on both the scoring and the additional scoring, in which the selecting includes removing from consideration templates for which the scoring indicates a match and the additional scoring indicates that the matching template is out of vocabulary.

* * * * *